United States Patent

Trammell et al.

(10) Patent No.: US 9,643,211 B2
(45) Date of Patent: May 9, 2017

(54) PASSIVE CHEMICAL SYSTEM FOR DETECTION OF GAMMA IRRADIATION

(71) Applicants: Scott A. Trammell, Springfield, VA (US); Brett D. Martin, Washington, DC (US)

(72) Inventors: Scott A. Trammell, Springfield, VA (US); Brett D. Martin, Washington, DC (US)

(73) Assignee: United States of America, as represented by the Secretary of the Navy, Washington, DC (US)

(*) Notice: Subject to any disclaimer, the term of this patent is extended or adjusted under 35 U.S.C. 154(b) by 510 days.

(21) Appl. No.: 13/872,428

(22) Filed: Apr. 29, 2013

(65) Prior Publication Data

US 2015/0004715 A1 Jan. 1, 2015

Related U.S. Application Data

(60) Provisional application No. 61/647,702, filed on May 16, 2012.

(51) Int. Cl.
| | | |
|---|---|---|
| *G01N 24/00* | (2006.01) | |
| *B05D 7/14* | (2006.01) | |
| *B05D 3/06* | (2006.01) | |
| *G01T 7/00* | (2006.01) | |
| *B82Y 30/00* | (2011.01) | |

(52) U.S. Cl.
CPC .............. *B05D 7/14* (2013.01); *B05D 3/068* (2013.01); *G01T 7/00* (2013.01); *B82Y 30/00* (2013.01)

(58) Field of Classification Search
CPC ............ A61K 49/0091; A61K 49/0423; A61K 49/0485; A61K 9/51; G01N 2015/1497; G01N 21/6428; G01N 33/54346; G01N 21/6489; G01N 33/533; G01N 33/553; G01N 33/587; G01N 15/10; G01N 2021/7786; G01N 21/06
See application file for complete search history.

(56) References Cited

U.S. PATENT DOCUMENTS

| | | | | |
|---|---|---|---|---|
| 5,321,357 A | * | 6/1994 | Maryanski | G01R 33/28 324/300 |
| 5,877,504 A | * | 3/1999 | Yanagita | G21K 4/00 250/484.4 |
| 5,988,822 A | * | 11/1999 | Abe | G02B 5/128 359/536 |
| 7,227,158 B1 | | 6/2007 | Patel et al. | |
| 7,651,633 B2 | | 1/2010 | Burrell et al. | |

(Continued)

OTHER PUBLICATIONS

Martin et al. "Generation of fluorescent silver nanoscale particles in reverse micelles using gamma irradiation", Chem. Commun., 2012, v. 48, pp. 10657-10659.*

(Continued)

*Primary Examiner* — Yelena G Gakh
(74) *Attorney, Agent, or Firm* — US Naval Research Laboratory; Stephen T. Hunnius

(57) ABSTRACT

Encapsulated fluorescent metal nanoparticles for radiation detection comprising metal ions in an aqueous solution encapsulated in a nanocapsule, wherein the metal ions form atoms when exposed to gamma-ray initiated reduction of the ions and then aggregate to form fluorescent nanoparticles.

5 Claims, 9 Drawing Sheets

(56) References Cited

U.S. PATENT DOCUMENTS 7,780,913 B2    8/2010  Farmer et al.
2004/0211917 A1* 10/2004 Adamovics ............... G01T 1/06
                                                      250/474.1

OTHER PUBLICATIONS

Martin et al. "Generation of fluorescent silver nanoclusters in reverse micelles using gamma irradiation: low vs. high dosages and spectral evolution with time", Appl. Nanosci., 2015, v. 5, pp. 411-418.*
Ravichandran et al., "Applications of conducting polymers and their issues in biomedical engineering", J. R. Soc. Interface, 2010, v. 7, pp. S559-S579.*
Bronstein et al. "Induced Micellization by Interaction of Poly(2-vinylpyridine)-block-poly(ethylene oxide) with Metal Compounds. Micelle Characteristics and Metal Nanoparticle Formation", Langmuir, 1999, v. 15, pp. 6256-6262.*
Doudna et al. "Radiolytic Synthesis of Bimetallic Nanoparticles with High Aspect Ratio", Mat. Res. Soc. Symp. Proc. 2003, vol. 740, pp. 359-364.*
Ershov and Henglein "Reduction of Ag+ on Polyacrylate Chains in Aqueous Solution", J. Phys. Chem. B, 1998, v. 102, No. 52, pp. 10663-10666.*
Carrot et al. "Gold nanoparticle synthesis in graft copolymer micelles", Colloid Polym. Sci., 1998, v. 276, pp. 853-859.*

* cited by examiner

9,643,211 B2

PASSIVE CHEMICAL SYSTEM FOR DETECTION OF GAMMA IRRADIATION

REFERENCE TO RELATED APPLICATION

This application is a non-provisional of, and claims priority to and the benefits of, U.S. Provisional Patent Application 61/647,702 filed on May 16, 2012, the entirety of which is hereby incorporated by reference.

BACKGROUND

This disclosure concerns the formation of fluorescent metal nanoparticles (NPs) within nanocapsules catalyzed by high-energy gamma radiation. The nanocapsules are based on block co- or terpolymers, and contain an aqueous phase.

The NP formation is a means of indicating that the catalyst (the radiation) was once present.

In one embodiment, we have used gamma ray-initiated reduction of silver ions in the encapsulated aqueous solution to form silver atoms, which then aggregate to form the fluorescent NPs.

In an end application, the nanocapsules can be suspended in a transparent resin that can be applied to walls, floors, etc. and allowed to dry.

Periodic testing for NP fluorescence will reveal if gamma radiation (thus, possibly weapons of mass destruction) was present in the vicinity.

We have found that use of the proper block copolymer as nanocapsule material leads to gamma-ray initiated formation of nanoparticles that have a distinctive fluorescence spectra. These spectra are quantitatively different from those arising from nanoparticles that are formed in other types of nanocapsules, or formed using other reactants such as reducing agents or UV irradiation.

This distinction is crucial for the effective use of the NPs as detectors of gamma radiation from fissile materials. This discovery of novel nanomaterials that interact with or are formed by high energy radiation provides a foundation for new nanoscale radiation indicators.

These discoveries are expected to have a large interest, because many types of fissile material (enriched uranium, for example) emit gamma radiation. The nanocapsules can be embedded in transparent resins that can be painted onto surfaces that may be exposed to fissile materials. Examples of such surfaces are the insides of shipping containers, truck, ship, or aircraft cargo compartments, and interior walls of storage depots.

SUMMARY OF DISCLOSURE

Description

This disclosure concerns a passive chemical system for the detection of gamma irradiation. The system is based on the gamma-ray induced formation of fluorescent metal NPs in nanocapsules. The nanocapsules are dispersible in resins, which can be painted onto surfaces that are likely to be exposed to fissile materials. When the painted surface is illuminated at the proper excitation wavelengths, the NPs will fluoresce, indicating that gamma radiation was once present.

In one embodiment, we have used in-situ-formed silver nanoparticles (Ag NPs) as detectors for (or reporters of) the past presence of gamma radiation. Also recognized was that the anionic regions of a block copolymer, acting as a support for the Ag NPs, could be tailored (selected or designed) to cause the fluorescence of the supported NPs to have a unique spectra if their formation was catalyzed by gamma radiation vs. other means such as UV radiation or stoichiometric reduction by a chemical reactant. The uniqueness of the spectra is essential for this invention to be fully useful, since the generation of fluorescent NPs by the latter two processes would create the risk of false alarms. We also developed the unique concept of encapsulating the reactants for nanoparticle formation in a block copolymer-based nanocapsule. Additionally we developed the concept of suspending the reactant-loaded nanocapsules in a transparent resin that can be painted onto walls, floors, or the insides of shipping containers.

Some previous work concerning a warning system for chemical or radiological substances include U.S. Pat. No. 7,780,913: "Paint for detection of corrosion and warning of chemical and radiological attack," involves a system for warning of corrosion, chemical, or radiological substances. The system comprises painting a surface with a paint or coating that includes an indicator material and monitoring the surface for indications of the corrosion, chemical, or radiological substances. The pigments generate fluorescence instantaneously (scintillate) when irradiated with ionizing radiation such as beta or gamma rays. The fluorescence ceases when the ionizing radiation ceases.

U.S. Pat. No. 7,227,158: "Stick-on self-indicating instant radiation dosimeter," describes diacetylene-type molecules that change from colorless to blue or red if exposed to >0.5 rad (dangerous) levels of radiation.

These examples and this previous work differ drastically from the current invention.

These examples help illustrate challenges in the prior art and problems we solved in our current invention.

Here, we have developed a passive chemical system for the detection of gamma irradiation. The system is based on the gamma-ray induced formation of fluorescent silver NPs in nanocapsules. The nanocapsules can be dispersed in transparent resins, which can be painted onto surfaces that are likely to be exposed to fissile materials. When the painted surface is illuminated at the proper excitation wavelengths, the NPs will fluoresce, indicating that gamma radiation was once present.

Metal NPs

Metal NPs have several novel physical and chemical properties that are caused by surface effects. The small size of the NPs causes many or most of the particle's atoms to appear on the surface. These surface atoms are chemically more reactive compared to the interior atoms because they usually have fewer coordinating neighbor atoms and more unsaturated sites. Therefore, metal NPs have large surface energies.

The large surface energies of metal NPs has allowed them to play important roles as advanced materials in catalysis, medicinal chemistry, etc. These energies also create favorable conditions for interactions with incident light that result in fluorescence. Thus, these materials are also beginning to be used in sensing applications. Their fluorescent properties are, however, heavily influenced by their preparation methods and conditions. Changes in these synthetic parameters result in alterations in particle size, shape, and surface stabilization which often lead to wide variations in particle fluorescence.

Silver NPs

Silver has the highest thermal and electrical conductivity of all the metals. Clusters, aggregates, and NPs composed of silver atoms are currently the subject of much investigation and are known for their catalytic, fluorescent, photonic, and antimicrobial properties, among others. Various investigators have shown that they can be easily formed from Ag+ using free-radical initiators in both aqueous and organic-based solutions. These types of syntheses can be done in confined nanospaces, such as polymer matrices, and leads to desirably narrow particle size distributions.

The synthesis is straight-forward, and the NP fluorescence is stable over long time periods. However, not all silver nano-aggregates are fluorescent. For intense fluorescence to occur, the silver must be present in certain specific forms. Some examples that have displayed high fluorescence include small atomic clusters supported by larger silver NPs, silver ions supported by a larger cluster of silver atoms, small neutral silver clusters in a noble-gas matrix, and small neutral silver clusters supported by microgels based on polyacrylic acid. In all of these cases, the materials were synthesized using either gamma radiation or lower-energy radiation in combination with photocatalysts.

Nano-Encapsulation

Block co- and terpolymers are macromolecules that have a linear arrangement of two or more different monomer block units. As a consequence of their molecular structure, they display unique solution and associative properties. For example, the self associative characteristics of the different blocks can lead to micelle formation. When a block copolymer is dissolved in a solvent that has solvation properties that are good for one block but poor for the other, the copolymer chains may associate reversibly to form micellar aggregates. Using this approach, people have begun to incorporate different chemistries into the block to create "nano-reactors" for the creation of metal NPs. Sometimes the addition of the metal cations with the proper polymer block will induce micellation. We have focused on the chemistry associated with the formation of fluorescent silver NPs in these types of "nano-reactors".

Gamma Ray Induced Reactions

High-energy radiation such as gamma rays is strongly ionizing and can lead to rapid scission of sigma- and π-bonds in water and organic materials. In the former, a water molecule is often split into a proton, a hydroxyl radical, and a free electron that quickly becomes solvated. The most reactive (the least stable) of these species is the solvated electron, with a reduction potential of −2.7 V. The proton and hydroxyl radical are slightly less reactive with reduction potentials of −2.3 V and −1.7 V at neutral pH. In somewhat slower reactions, the proton can combine with the solvated electron to form a hydrogen atom, and the hydroxyl radical may combine with scavengers such as alcohols. Due to the formation of protons, large doses of gamma rays can result in the lowering of the pH of aqueous solutions. Gamma rays also cause chain scission in organic molecules, with π-bonds and electronically deficient sigma-bonds (such as those in hydroxyketones) being particularly labile. Chain scission in the former has been exploited for gamma ray induced polymerization of alkenes and acrylates. Those in the latter have been used in the photoinitiation of several types of organic free-radical reactions, including single-electron reduction reactions.

Conducting Polymers

Extended π-conjugated electrically conducting oligomers and polymers have unique properties that have impacted diverse technologies, and have resulted in the appearance of new ones. A partial list of current and developing applications includes micro- and nanoscale circuitry, throwaway electronic devices such as plastic electrochromic displays, flexible displays, lightweight storage batteries, corrosion protection coatings, and antistatic coatings.

Conducting polymers exist in two chemically distinct states, "doped" (oxidized, conducting) and "dedoped" (reduced, semi-conducting). In FIG. 1, two types of conducting polymers (polythiophene (PTP)) and poly 3,4 ethylenedioxythiophene (PEDOT)) are shown in both chemical states. The doped states contain radical cations (polarons), bipolarons, and are pi-conjugated, with associated counterions. The doped form of PEDOT and its oligomeric form (oligoEDOT) have high water solubilities if large counteranions such as tosylate are present. The dedoped states are electrically neutral and aromatic. The polymer is readily transformed from one state to the other in an electrochemical or chemical redox process. An example of the latter type of redox transformation is the reaction of a hydroxyl radical or a hydrogen atom with the oxidized form of PEDOT (or oligoEDOT) to form the ion pair PEDOT(+)OH(−) or the adduct HPEDOT. These polymers are thus able to act as free-radical scavengers.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

Example 1

In one embodiment, we formed fluorescent silver NPs within block polymer nanocapsules using a gamma ray-initiated process.

We first formed the nanocapsules by dissolving a block copolymer (poly acrylic acid [AA]-poly styrene, with blocks having molecular weight of ~4000 and ~6000) in chloroform, then introducing an aqueous phase with a high pH.

Approximately twenty milligrams of polymer was introduced into ten milliliters of chloroform, and two milliliters of 0.4 molar tert-butyl ammonium hydroxide was then added.

As the mixture was stirred gently overnight, the AA residues were deprotonated by the hydroxide base present in the mixture. This caused them to become hydrophilic, and the presence of the hydrophobic chloroform led to sequestration of the AA and resulting formation of nanocapsules.

As the nanocapsules formed they enclosed a small amount of aqueous phase. The reaction was terminated after two days, and the aqueous and chloroform phases were allowed to separate. The nanocapsules were retained in the chloroform phase, which was saved and placed into a plastic centrifuge tube.

Two aliquots of the solution were taken out and set aside as controls.

Using the remaining solution, a silver salt (specifically, silver nitrate $Ag^+NO_3^-$, 5 milligrams), was introduced into the chloroform phase, and remained as a macroscopic solid. The tube was tightly sealed, and the mixture was sonicated in a water bath for 15 minutes, which caused the silver nitrate to partially dissolve and enter the aqueous phase in the nanocapsules. The tube was allowed to float in the water as the sonication proceeded.

The chloroform solution with the silver-nitrate-laden nanocapsules was then aliquoted and some of the aliquots were subjected to gamma irradiation from a cobalt-60 source.

The silver-free control solutions were exposed in a similar manner. The exposure was done at various times and distances from the source to vary the radiation intensity.

All solutions were then subjected to characterization for nanoparticle sizing, UV-visible spectra, and fluorescence spectra (Table 1). Solution-phase nanoparticle size measurements were performed using light-scattering instrumentation.

It was found that the gamma-irradiation caused formation of fluorescent silver nanoparticles (NPs) in nanocapsules (NCs) with a distinct size distribution.

For comparison, remaining unexposed aliquots were then exposed to UV irradiation (320 nm for 10 minutes). This resulted in formation of fluorescent silver NPs as well, having their own size distribution.

The UV- and fluorescence spectra and size distributions of both types of NCs were measured and compared, and all were found to be very different. The results are summarized in Table 1.

Figure 1:
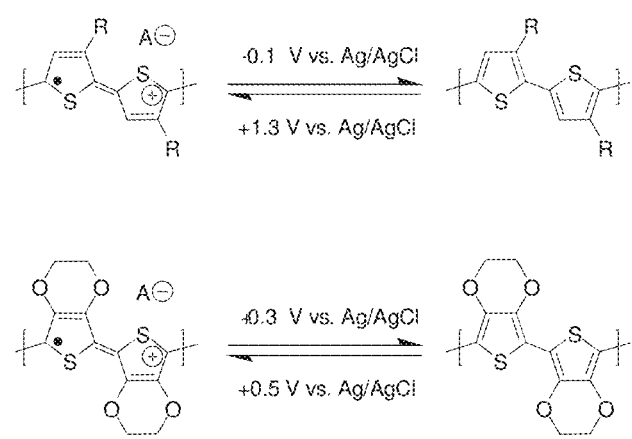
FIG. 1 illustrates oxidized and reduced states of PTP and PEDOT, and the half-wave redox potentials associated with the state changes. R is often hydroxyalkyl, alkoxy, or alkyl.
Figure 2:
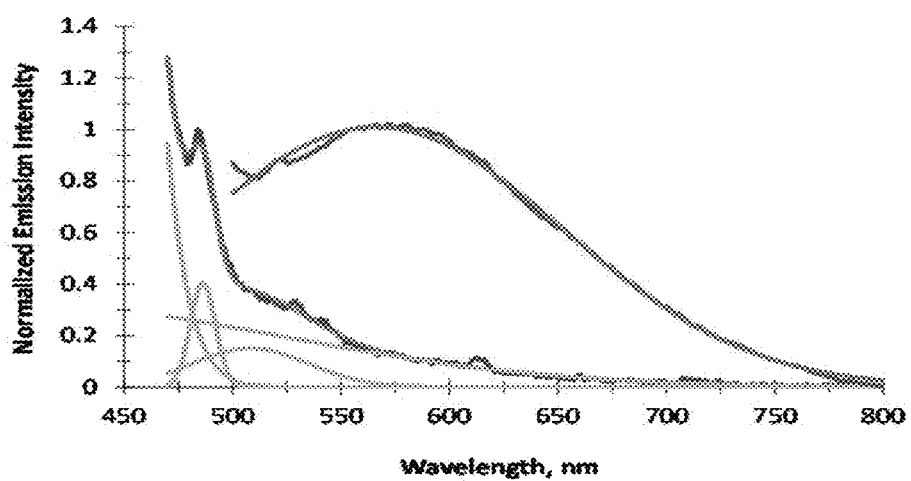
FIG. 2 illustrates emission spectra of NCs/NPs formed using UV irradiation (red trace) and gamma irradiation (630 Gys, dark blue trace). The excitation wavelength was 450 nm. The deconvoluted spectra for the latter are shown as light blue traces.

As is seen in Table 1, the NC size and polydispersity is considerably larger in the case of samples exposed to gamma irradiation vs. all of the other cases. In particular, the size is nearly four times larger. Also, the fluorescence emission maximum wavelength is 475 nm with a shoulder at 506 nm, 60 nm blue-shifted relative to that of NCs/NPs formed using UV irradiation (FIG. 2). The excitation wavelength was 450 nm. Finally, the UV-visible spectrum of the gamma-exposed NCs/NPs has a maximum wavelength of 400 nm vs. 475 nm for that of NCs/NPs formed using UV irradiation, and distinctively different wavelength for the other sample types.

Figure 3:
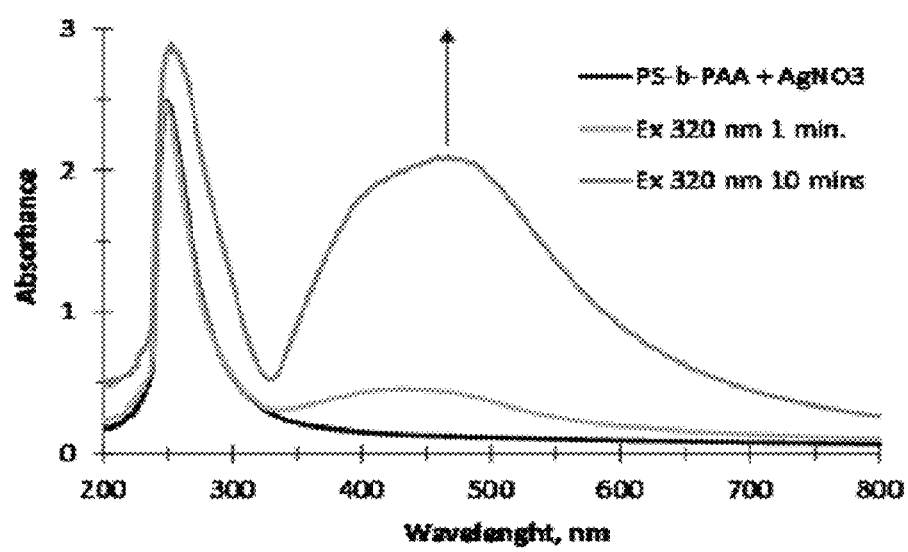
FIG. 3 illustrates UV-visible absorbance spectra for NCs/NPs formed using UV irradiation at 320 nm for 1 minute and 10 minutes, and the spectrum for the unradiated control.

FIG. 3 shows the UV-visible absorbance spectra for NCs/NPs formed using UV irradiation at 320 nm for 1 minute and 10 minutes, and the spectrum for the unradiated control. Clearly, the absorbance with maximum wavelength at 475 nm increases with irradiation time.

Figure 4:
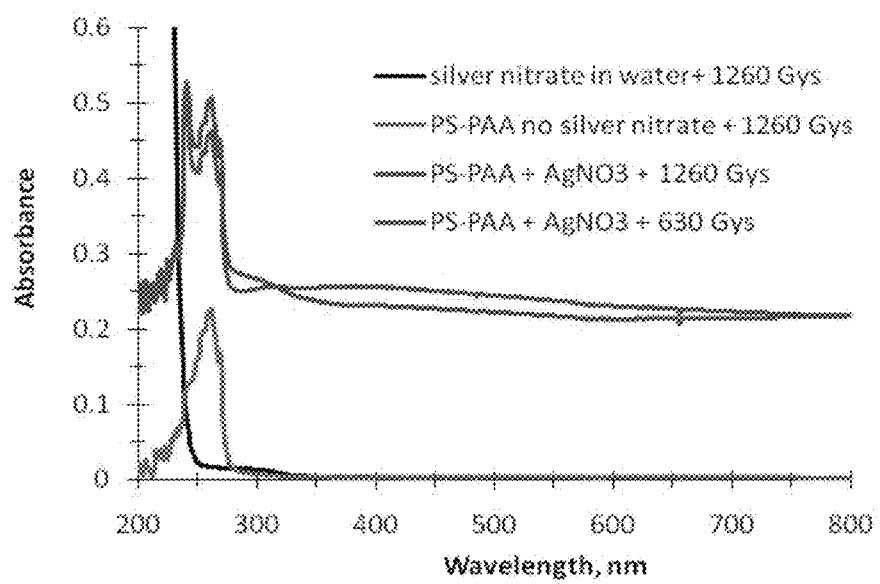
FIG. 4 illustrates UV-visible absorbance spectra for NCs/NPs formed using gamma irradiation at 630 Gys (blue trace), 1260 Gys (red trace). The controls with no silver nitrate or no block copolymer are shown in green and black, respectively.

FIG. 4 shows the UV-visible absorbance spectra for NCs/NPs formed using gamma irradiation at 630 Gys (blue trace), 1260 Gys (red trace). The controls with no silver nitrate or no block copolymer are shown in green and black, respectively. The gamma irradiation results in a wavelength-independent background absorbance combined with a new peak at 245 nm. Both evidently arise from the newly-formed silver NPs.

Figure 5:
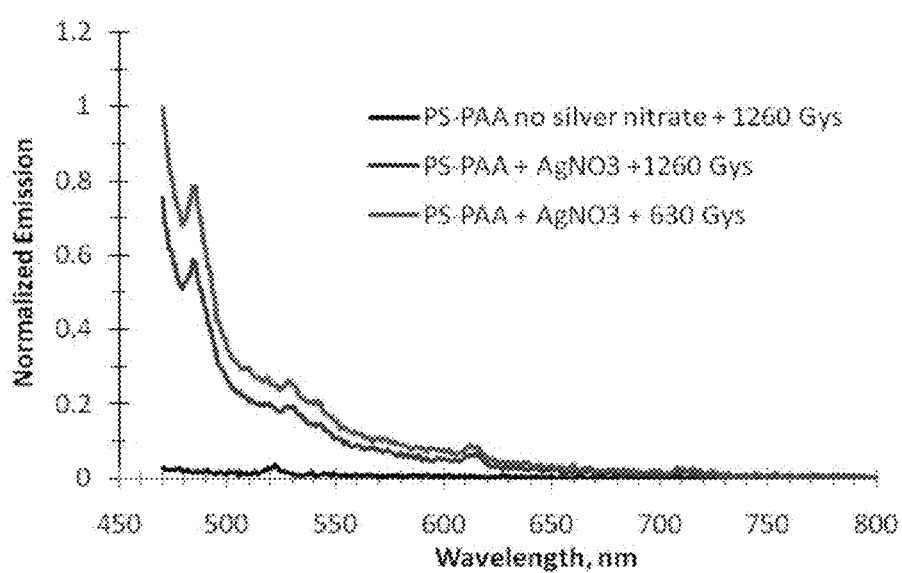
FIG. 5 illustrates emission spectra for NCs/NPs formed using gamma irradiation at 630 Gys (dark blue trace), and 1260 Gys (light blue trace).

FIG. 5 gives the emission spectra for NCs/NPs formed using gamma irradiation at 630 Gys (dark blue trace), and 1260 Gys (light blue trace). The excitation wavelength was 450 nm. The higher radiation dose led to slightly lower fluorescence. This effect may be eliminated or reversed if free-radical scavengers are added to the encapsulated aqueous solution.

Example 2

In another embodiment, toluene was used instead of chloroform as the nonpolar solvent, and commercially available PS-PAA having polystyrene (n=50, MW 5200) and polyacrylic acid (n=65, MW 4800) was dissolved at a concentration of 2 mg mL in 10 mL toluene.

Encapsulation of Ag+ ions into the aqueous core was accomplished by using a two phase system with the polymer-toluene solution on the top, and the buffer on the bottom (pH 7.2, 10 mM MOPS) containing 10 mL of 10 mM AgNO3. After 16 h of stirring in the dark, the amounts of polymer and Ag+ in the toluene layer were determined by thermogravimetric analysis (TGA) and anodic stripping square wave voltammetry.

We found that the mass of the Ag+ in the toluene layer was 10-fold lower than that of the polymer, but the molar concentration of the Ag+ was 10-fold higher than that of the

TABLE 1

Salient features of the nanocapsules, sizes and spectral $\lambda_{max}$. "NC" denotes nanocapsule, "2 days prep" indicates 2 days stirring time for NC formation in chloroform.

|  | PAA-b-PSS NC only (2 days prep) gamma | AgNO$_3$ in water, gamma | PAA-b-PSS NC + AgNO$_3$ (2 days prep) | PAA-b-PSS NC + AgNO$_3$ UV 320 nm 2 days prep) | PAA-b-PSS NC + AgNO$_3$ gamma (2 days prep) |
|---|---|---|---|---|---|
| nanocapsule size | 104 nm | — | 125 nm | 93 nm | 390 nm |
| polydispersity | 0.09 | — | 0.17 | 0.18 | 0.31 |
| emission $\lambda_{max}$ (ex 450 nm) | none | none | none | 566 nm | 475 nm with a shoulder at 506 nm |
| UV-visible $\lambda_{max}$ | 260 nm | <240 nm | 255 nm | 470 nm | 400 nm (sh) | polymer. This suggests that the PAA portion of each block copolymer molecule is ion-paired with 10 Ag+ ions.

To generate the fluorescent Ag NCs, 1 mL aliquots of the toluene layer were irradiated in a 60 Co pool at various doses. The toluene solutions that had not been irradiated but kept in the dark show no peaks in the visible absorbance spectra after encapsulation of the Ag+ in the reverse micelle. However, upon gamma irradiation, a broad absorption peak centered at 565 nm becomes apparent, which we presume arises from the Ag NCs (FIG. 2A). As the dosage is increased from 500 Gy to 1 kGy, the absorbance increases proportionally.

Figure 9:
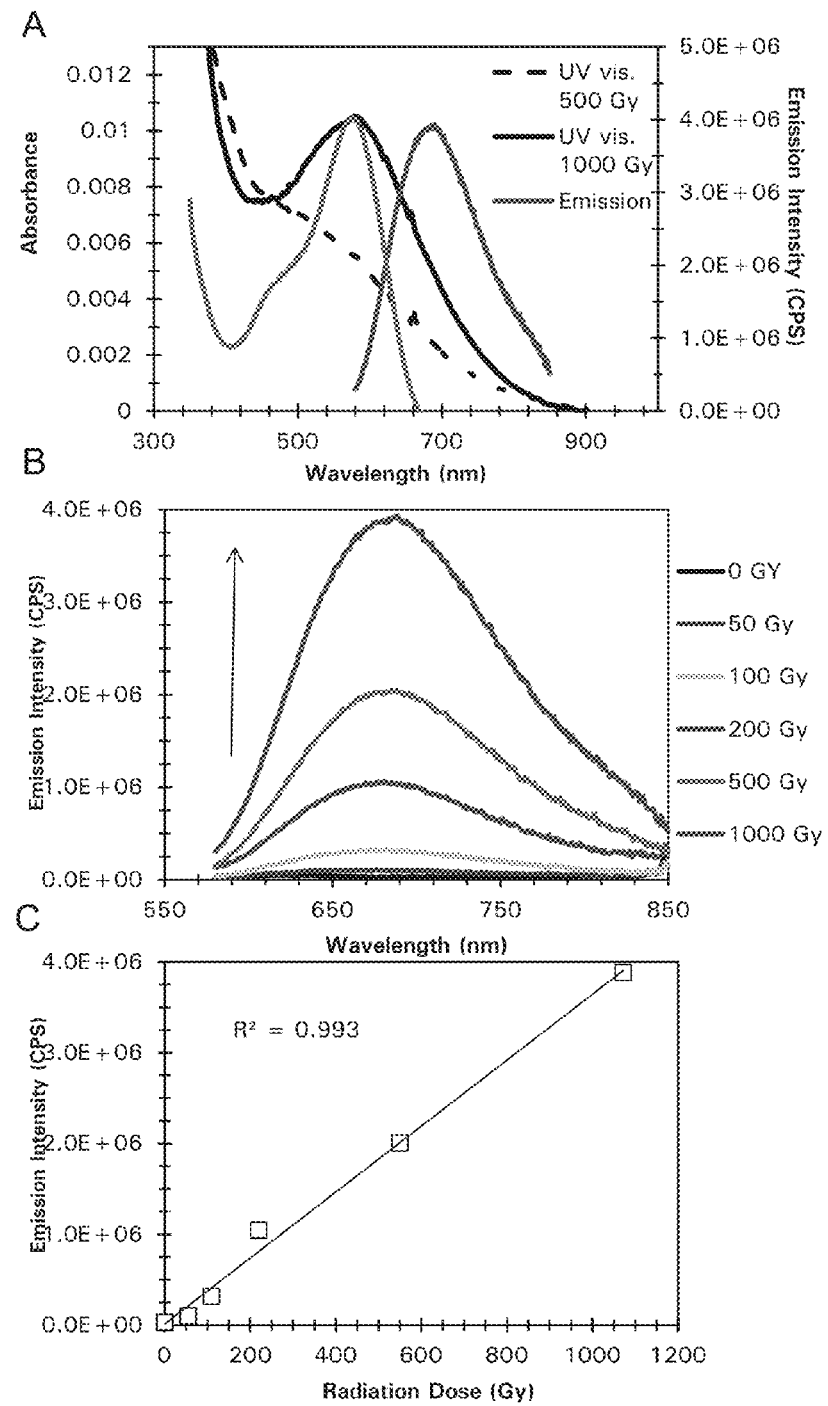
FIG. 9 illustrates (A) Absorbance, emission and excitation spectra of fluorescent silver nanoclusters generated using gamma-irradiation (1000 Gy); (B) Emission spectra of fluorescent silver nanoclusters generated with increasing gamma-irradiation dose; and (C) Emission intensity vs. radiation dose.

FIG. 9 shows the dose response of gamma-ray induced formation of silver NPs in nanocapsules formed in toluene solutions.

Results suggest there are effects of synthesis conditions on NC/NP optical properties, including fluorescence. The particles can be characterized using techniques such as TEM, FTIR, and XRD. During particle synthesis, the effects of such variables as the gamma ray dosage, the size of the nanocapsules, the concentration of silver salts, the concentration of free radical scavengers, the oxygen concentration, and the identity and concentration of polyanions or anionic moieties attached to the inner walls of the nanocapsule (these serve as supports for the nucleation of the silver atoms) can be adjusted accordingly.

Gamma ray doses and exposure times that are similar to those previously reported for the gamma initiated formation of silver NPs can be used and the exact relationship between gamma ray dosage and fluorescence characteristics can be determined and relationships between dosage, fluorescence, synthesis method, and nanocapsule size can be identified in more detail.

The manner in which the optical properties of the synthesized NCs/NPs change over time periods of as long as 1 year, in the presence of such environmental influences such as temperature extremes and UV radiation can be tested.

The dispersive behavior of the NCs/NPs can also be more fully detailed. For example, suspending them in transparent resins that are essentially pigment-free (transparent) forms of oil-based paints allows for detailed analysis. The transparency of the final dry resin will allow analysis of NC/NP dispersion and fluorescence characteristics when in the dispersed state.

Co-/Terpolymers and Nanoencapsulation

Reverse micelles formed from di- or tri-block copolymers with polar cores dispersed in low-polarity solvents have been used as nanoreactors to create inorganic NPs. The polar core of the micelle brings together the inorganic species, localizing the inorganic reaction and provides easy control over the size and size distribution of the formed NPs.

In our invention, the reactants are encapsulated in an aqueous phase by di- or tri-block copolymers that form nanospheres with their hydrophilic moieties facing inward and hydrophobic ones facing outward. The formation of highly fluorescent Ag NPs is very sensitive to the encapsulating polymer matrices.

We are incorporating functional groups in the block copolymers that are known to be necessary for the creation of highly fluorescent Ag clusters and NPs. For example, polymers containing polyacrylic acid (PAA) are important components in the formation of fluorescent Ag NPs in microgels. In addition, DNA templates with their negatively charged backbone can also be used for formation of fluorescent Ag NPs. The anionic groups help sequester the $Ag^+$ into the polymer matrix. Also, particle aggregation is prevented, which is necessary for retention of fluorescence.

Figure 6:
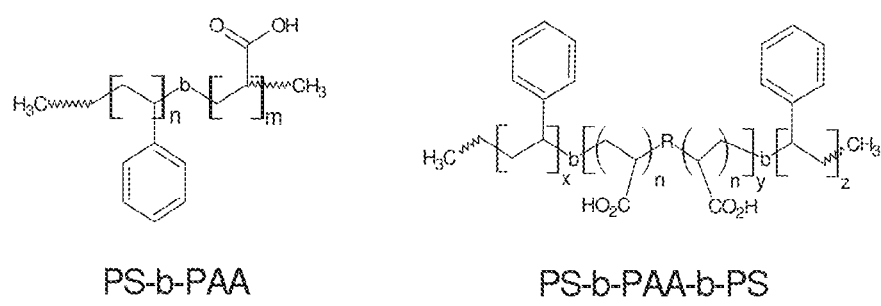
FIG. 6 illustrates block copolymers.

In our copolymers, we use acrylic acid blocks which have been reported to be effective in the formation of silver NPs. From a vendor we purchased the block copolymer PS-b-PAA and PS-b-PAA-b-PSS (FIG. 6). These di and tri block polymers are well known to undergo micellization. The $M_n$ of the PS and PAA blocks available varies between 800 and 50,000 g/mol and the polydispersity of the block polymers varies between 1.08 to 1.4. By varying the size of the blocks, solvent conditions, and internal pH, we gained an understanding of the variables that govern the fluorescence of the NCs/NPs.

The nanocapsule formation will be similar to micelle formation from block co-polymers containing charged blocks. These are known to create micelles in organic solvents with a polar water core. These structures have been shown to take up metal ions for NP formation. In the reported cases, protonated polyvinyl pyridine (PVP) was used as the polar core. In our case, we use deprotonated PAA as the charged polar core.

Free-Radical Scavenging

The NP formation chemistry can be accelerated greatly if one of two free-radical scavengers is used. Examples of scavengers include an organic alcohol (for example, tert-butanol) or the redox-active conducting oligomer oligoE-DOT-tosylate. The doped oligoEDOT-tosylate can act as a scavenger for hydroxyl and hydrogen radicals, but its reducing strength is insufficient for reduction of Ag+, which is desirable. The encapsulation can be done in an aqueous phase using a di or tri-block copolymer, which will form nanospheres with their hydrophilic moieties facing inward and hydrophobic ones facing outward. For this first encapsulation step we can use approaches that are well defined in the literature.

Figure 7:
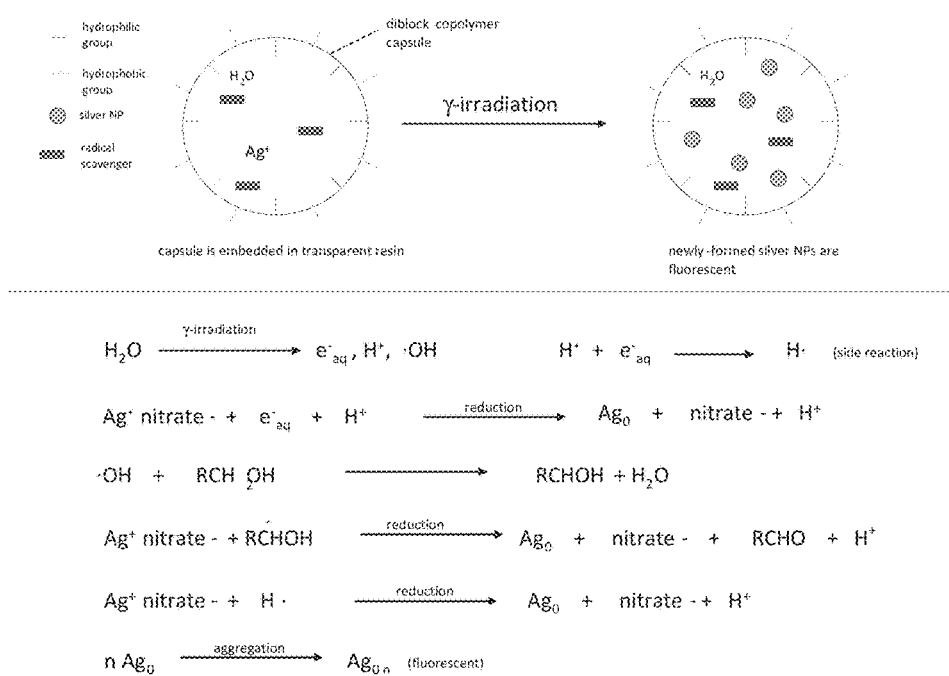
FIG. 7 illustrates a scheme for gamma-ray induced formation of silver NPs in nanocapsules based on block co- or terpolymers. An alcohol free-radical scavenger is used.
Figure 8:
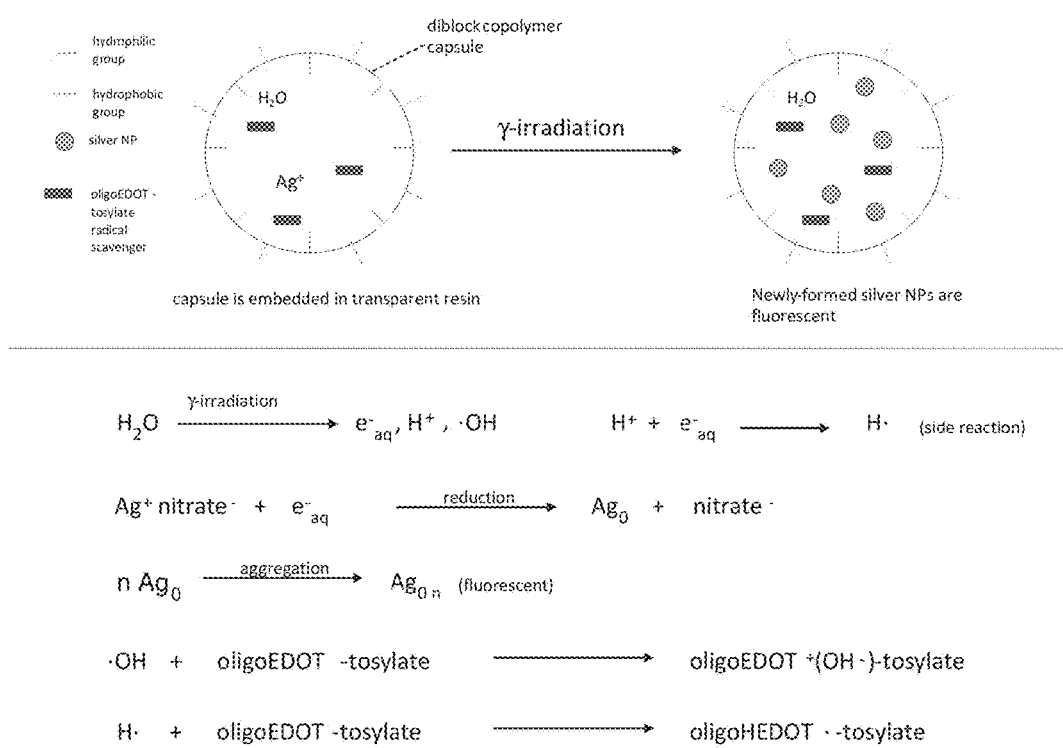
FIG. 8 illustrates a scheme for gamma-ray induced formation of silver NPs in nanocapsules based on block co- or terpolymers.

After formation, the nanocapsules can be suspended in a transparent or non-transparent coating material such as an oil-based resin. When the applied, dry resin is subjected to gamma radiation the aqueous phase in the nanoencapsules will experience water scission reactions that will yield solvated electrons, hydroxyl radicals, and hydrogen radicals (FIGS. 7 and 8). The solvated electrons are the most reactive, and will reduce the $Ag^+$ and cause formation of Ag(0). The Ag(0) (atomic silver) then will form clusters/aggregates, which are highly fluorescent (excitation ~565 nm, emission ~690 nm).

In the case where alcohol serves as the free-radical scavenger (FIG. 7), it will react with the hydroxyl radicals to form the alcohol radical shown. The alcohol radical can then independently reduce $Ag^+$ to form Ag(0). Also, the hydrogen atoms formed through gamma-ray water scission can also serve to reduce $Ag^+$ to Ag(0). In this scenario there are three separate pathways to Ag(0) formation.

As described, one advantage of the described invention is the establishment of a unique fluorescent emission response by gamma radiation. The NCs/NPs can therefore act as a passive detection system that will not be observable to individuals unless they have the proper illumination equipment and training. The NCs/NPs are expected to be indefinitely stable when suspended in transparent or other paintable or painted resins.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A passive chemical system for detection of gamma irradiation made by the process of:
   providing silver ions in an aqueous solution encapsulated in reverse micelles comprising a block copolymer which leads to gamma-ray initiated formation of nanoparticles that have a distinctive spectra and containing a buffer with a pH of 7.0 to 10.0 and formed by co-block polymers of polystyrene block length MW 4200 to 6200 and polyacrylic acid MW 3800 to 5800 in toluene;
   dispersing the silver ions in transparent resins which can be painted onto surfaces;
   exposing the silver ions to gamma-rays;
   initiating reduction of the silver ions upon exposure to the gamma-rays and thereby aggregating the silver ions; and
   forming nanoparticles that are not visible until illuminated that indicate gamma radiation was once present.

2. A passive chemical system for detection of gamma irradiation made by the process comprising:
   providing a diblock copolymer capsule comprising metal ions and an aqueous mixture comprising Ag cations encapsulated in reverse micelles containing a buffer with a pH of 7.0 to 10.0 and formed by co-block polymers of polystyrene block length MW 4200 to 6200 and polyacrylic acid MW 3800 to 5800 in toluene;
   wherein the metal ions are silver ions;
   dispersing the silver ions in transparent resins which can be painted onto surfaces;
   providing radical scavengers; and
   forming silver nanoparticles after gamma radiation;
   wherein the silver nanoparticles are not visible until illuminated that indicate gamma radiation was once present.

3. A passive chemical system for detection of gamma irradiation comprised of Ag cations encapsulated in reverse micelles containing a buffer with a pH of 7.0 to 10.0 and formed by co-block polymers of polystyrene block length MW 4200 to 6200 and polyacrylic acid MW 3800 to 5800 in toluene that produce Ag nanoparticle upon gamma radiation and dispersed in transparent resins which can be painted onto surfaces and that are not visible until illuminated that indicate gamma radiation was once present.

4. A method of detecting gamma radiation comprising:
   forming a two-phase solution from an aqueous solution and an organic solvent with a block copolymer present in one of the phases;
   encapsulating silver ions in an aqueous solution buffer with a pH of 7.0 to 10.0 in nanocapsules formed from the block copolymer; and
   dispersing the nanocapsules in transparent resins which can be painted onto surfaces;
   wherein if gamma-radiation is present the nanocapsules are exposed to gamma-rays, which leads to
      initiating reduction of the silver ions and forming atoms from the silver ions, wherein the silver atoms are aggregated and produce fluorescence thus detecting gamma radiation.

5. The method of claim 4 wherein the block copolymer comprises polystyrene and polyacrylic acid.

* * * * *